United States Patent
Niemi et al.

(10) Patent No.: US 8,307,204 B2
(45) Date of Patent: Nov. 6, 2012

(54) CIPHERING AS A PART OF THE MULTICAST CONCEPT

(75) Inventors: Valtteri Niemi, Helsinki (FI); Antti-Pentti Vainio, Espoo (FI); Sinikka Sarkkinen, Kangasala (FI); Niina Karhuluoma, Hämeenkyrö (FI); Jan Kall, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 1085 days.

(21) Appl. No.: 10/493,466

(22) PCT Filed: Jun. 28, 2002

(86) PCT No.: PCT/IB02/02497
§ 371 (c)(1),
(2), (4) Date: Apr. 23, 2004

(87) PCT Pub. No.: WO03/036907
PCT Pub. Date: May 1, 2003

(65) Prior Publication Data
US 2005/0021945 A1    Jan. 27, 2005

(51) Int. Cl.
*H04L 29/06* (2006.01)
(52) U.S. Cl. .......................... 713/163; 713/150
(58) Field of Classification Search ............... 380/232; 713/150, 151, 153, 163
See application file for complete search history.

(56) References Cited

U.S. PATENT DOCUMENTS

| | | | |
|---|---|---|---|
| 5,748,736 A | 5/1998 | Mittra | |
| 5,751,813 A | 5/1998 | Dorenbos | |
| 5,987,137 A * | 11/1999 | Karppanen et al. | 380/28 |
| 6,195,751 B1 | 2/2001 | Caronni et al. | |
| 6,223,286 B1 * | 4/2001 | Hashimoto | 713/178 |
| 2001/0001014 A1 * | 5/2001 | Akins et al. | 380/241 |

FOREIGN PATENT DOCUMENTS

| | | |
|---|---|---|
| EP | 0 944 275 A2 | 9/1999 |
| EP | 1 119 132 A2 | 7/2001 |
| WO | 9907150 A1 | 2/1999 |
| WO | WO 99/16277 | 4/1999 |
| WO | 9952304 A1 | 10/1999 |
| WO | WO 01/17288 A1 | 3/2001 |
| WO | WO 01/45317 A2 | 6/2001 |

OTHER PUBLICATIONS

Blom et al, "The Secure Real Time Transport Protocol", Internet Draft, <draft-ietf-avt-srtp-01.txt>, Jul. 2001, XP002222660, retrieved from the Internet: URL:http://www.globecom.net/ietf/draft/draft-ietf-avt-srtp-01.html, retrieved on Nov. 27, 2002.

ETSI: "Universal Mobile Telecommunications System (UMTS); 3G Security; Security Architecture (3GPP TS 33.102 version 3.9.0 Release 1999)" ETSI Technical Specification, Sep. 2001, XP002222659, retrieved from the Internet: URL:http://www.etsi.org/, retrieved Nov. 27, 2002.

PCT International Search Report, International Application No. PCT/EP01/12301, Date of Completion: Jun. 6, 2002, Date of Mailing: Jun. 27, 2002, pp. 1-3.

* cited by examiner

*Primary Examiner* — Beemnet Dada
*Assistant Examiner* — Suman Debnath
(74) *Attorney, Agent, or Firm* — Squire Sanders (US) LLP

(57) ABSTRACT

The invention proposes a method for transmitting a message to a plurality of user entities in a network by using a multicast service, comprising the steps of encrypting a multicast message by using ciphering, and sending the encrypted multicast message to the plurality of user entities simultaneously. The invention also proposes a corresponding multicast service control device and a corresponding user entity.

50 Claims, 3 Drawing Sheets

CIPHERING AS A PART OF THE MULTICAST CONCEPT

FIELD OF THE INVENTION

The present invention relates a method for transmitting a message to a plurality of subscribers.

BACKGROUND OF THE INVENTION

The reception of traffic in point to multipoint (PTM) communication is typically organized in the following way:

A potential receiver must become a member of a receiver group (join the group) and whenever he wants to quit the reception he must leave the group. During the group membership the PTM data reception is possible. Parties not being members do not receive this data. Joining and leaving can be done whenever wanted. This kind of communication model is called multicasting. A special case of multicasting is broadcasting in which the data is delivered to all potential receivers.

When multicast communication model is applied to a mobile environment, limiting the data reception only to joined members might become a problem since the data is delivered over a radio link thus making eavesdropping possible to non-group members. With encryption this problem can be solved by enabling only authorized parties (i.e. receivers that have joined the group) to decrypt the delivered encrypted data. The decryption is made possible by giving the decryption key only to the group members.

The work to standardise the Multicast as a new service has been started in 3GPP (Third Generation Partnership Project). The aim in this work is to enhance the current capabilities in UTRAN (UMTS terrestrial radio access network) (and maybe later also in CN (core network)) the way that it is also capable of providing such services, which are using the common network resources, but which are intended only to a restricted group of people in a cell. These requirements are not fulfilled in current Cell Broadcast concept, which is already standardised in 3GPP release 99.

Basically the standardisation of the multicast type of service means that the new service concept should be capable of transmitting data simultaneously to a group of people, who previously indicated their interest to receive data from a Multicast service. As part of their indication they also accepted that the service provider is allowed to charge subscribers for the service (the charging can be based on e.g. monthly fee, the usage time of the multicast service or the amount of received data). It is noted that the service provider can be either the external service provider (e.g. a person, community, state, government, company) who does not own the network or operator itself, who owns the network through which multicast data is transmitted.

In one cell the multicast related data is sent at the same time to all subscribers by using a single communication path on the radio interface. In UTRAN this communication path can consist of e.g. SCCPCH (Secondary control Channel, a physical channel), which is currently used to transmit data from common channels and the FACH (Forward Link Access Channel, a transport channel), which is devoted for the cell broadcast services. The main requirement for the used channel is that this channel can/is allowed to listen more than one UE and it is capable of transmitting also streaming type of data.

A cell broadcast service is a service type, which is already part of the 3GPP release 99. Cell broadcast service uses as a transport channel Forward Access Channel (FACH) and on the air interface secondary common physical channel (SC-CPCH). The cell broadcast service is characterised by such services, which are not secured or charged from end users by the service provider (or operators) and each UE in the cell—even if they are in Idle mode—are allowed to listen the data from the air interface, which is belonging to the cell broadcast service. A typical-cell broadcast service could be e.g. small advertisements, road information etc.

In order to use such a commonly known channel on the air interface and at the same time to provide e.g. charging, in the multicast scheme it should be possible for the service providers (or the network) to allow only the authorised subscribers to access the multicast service. This means that it shall be possible to exclude all unauthorised users from the service even if the UE (User Entity) is capable of listening to the physical channel. For multicast services it has been proposed to use ciphering for this purpose.

Ciphering of multicast services is not a similar concept as the ciphering that is used for e.g. dedicated channels. When the used transport channel is a dedicated transport channel (or a common channel for DCCH (Dedicated control Channel) or DTCH (Dedicated Traffic Channel) (DCCH and DTCH are both logical channels)), the used security information is sent to the UE upon establishment of the radio bearer (RB). For that purpose, for the UE, the NW has before the actual data transmission (and also upon that) setup separate signalling connections for the transmission of L3 signalling messages. It is noted that L3 stands for Layer 3 (in UTRAN=RRC (Radio Resource Control)), a protocol layer.

The multicast services were not supported by 3GPP rel.99 or rel.4, and therefore no security procedures for point-to-multipoint services have been defined. Also it is not possible to separate between unauthorised and authorised users from service point of view on such channels, which are commonly used for multiple UEs.

It is noted that the sharing of the common channels between multiple UEs is possible due to use of UE specific identification in the data message. This method however is not feasible as such in this case because data is meant to a group of UEs and the use of "group id" instead of UE specific id does not prevent unauthorised UEs to fetching data from the shared common channel.

SUMMARY OF THE INVENTION

Thus, the object underlying the invention resides in allowing network to provide secured multicast services (i.e. point-to-multipoint services).

This object is solved by a method for transmitting a message to a plurality of user entities in a network by using a multicast service, comprising the steps of
encrypting a multicast message by using ciphering, and
sending the encrypted multicast message to the plurality of user entities.

Thus, a multicast message is encrypted. That is, the message can be sent via a common channel over the network, and only those subscribers which are allowed to receive this message may decrypt it.

Therefore, the reception of a multicast message, i.e., point-to-multipoint data is restricted on a specific group of subscribers. Moreover, by encrypting the message, also different multicast sessions can be established in one cell. That is, different multicast services can be offered in the same cell in the same time.

The invention also proposes a multicast service control device for transmitting a message to a plurality of user entities in a network, by using a multicast service wherein the device is adapted to encrypt a multicast message by using ciphering, and to send the encrypted multicast message to the plurality of user entities.

Moreover, the invention proposes a user entity in a network which is adapted to receive an encrypted multicast message transmitted to a plurality of user entities in a network by using a multicast service, and to decrypt the encrypted multicast message by using deciphering.

Furthermore, the invention also proposes a network comprising a multicast service control device described above and at least one user entity described above.

Further advantageous developments are set out in the dependent claims.

In particular, the encrypted multicast message may be decrypted in each user entity individually.

The ciphering may be performed by using a ciphering key, wherein the ciphering key may be the same for encrypting and decrypting, or a first ciphering key may be used for encrypting whereas a second ciphering key different from the first ciphering key may be used for decrypting.

The ciphering key may be changed in a defined time frame. In this way, security can be improved since the ciphering key is changed regularly.

Ciphering key generation related input parameters may be sent to the user entity when the user entity registers with a service sending encrypted messages to a plurality of user entities. Alternatively, ciphering key generation related input parameters may be sent to the user entity when a transmission of encrypted messages to a plurality of user entities is activated. Thus, ciphering key generation related input parameters can be sent to the user entity by using normal control signalling.

It is noted that not all ciphering key generation related input parameters are sent during one occasion. That is, some parameters may be sent during registration of the subscriber, and other parameters may be sent on activation of the transmission.

Thus, the actual ciphering key is not sent over the air interface. Instead, basically such ciphering related parameters based on which UE is capable of calculating correct deciphering key are sent.

By sending those parameters, and not the actual ciphering key, security is improved.

The ciphering key may be stored in a memory of the user entity, or it may be stored in a subscriber identification module (SIM). The ciphering key should not be accessible for the user of the user entity. In this way, the security can be improved.

Moreover to improve security against, e.g., a hacker, at least one input parameter may be used for encrypting. Such an input parameter may comprise at least one subscriber related value. Thus, it is ensured that only the subscriber to which the value relates is able to decrypt the message.

The subscriber related value may comprise a group identification for identifying a whole group of subscribers which are allowed to receive the message. In this way, the operation load for assigning a subscriber value to each subscriber individually can be reduced.

The input parameter may comprise at least one service related value. Thus, in this way the multicast message can only be decrypted in case the user entity knows this service related value. Hence, it can be ensured that only those user entities may decrypt the multicast message which have subscribed to the service.

Such a service related value may comprise a service identification for identifying a service type. The service type denotes a group of services. Moreover, the service related value may comprise a subservice identification for identifying a particular service.

The input parameter mentioned above may also comprise at least one network related value for identifying a particular network. Furthermore, the input parameter may comprise at least one cell related value for identifying a particular cell.

The input parameter may also be described in the identification of the multicast data frame (i.e. upon active data transmission). This identification can be e.g. sequence number, timestamp etc. With the aid of the packet related identification the security of the transmission can be improved, because the used encryption changes frame by frame.

For decrypting, the input parameter used for encrypting may be used. That is, the same input parameter which was used for encrypting is also used for decrypting.

The input parameter may be stored in a memory of the user entity, or/and it may be stored in a subscriber identification module (SIM).

The input parameter should not be accessible for the user of the user entity. In this way, the security can be improved, since the user can not access the security parameters.

Some or all of the required input parameters may be sent to the user entity upon registering to a service.

Some or all of the required parameters may be sent to the user entity as a control information of the actual multicast data packets (i.e., e.g., inside the header of the Multicast data frame or as an independent control frame).

The receiving of multicast related data may trigger the start of the decryption. Alternatively, the start of the decryption may be triggered by the network, by sending pre-information of a multicast message to be sent. Furthermore, the start of the decryption may be triggered by the subscriber. Thus, three different ways about how the decryption is actually started are proposed. The trigger may be a pin code or a password.

For encryption an encryption algorithm may be used which uses at least a counter value as an input parameter, which is delivered to the plurality of user entities. That is, by delivering the counter value to the user entities, the same kind of encryption algorithm as in, e.g., UMTS may be used. In this way, the method according to the invention can easily be applied to existing schemes. The encryption algorithm may be the f8 encryption algorithm.

The counter value may be delivered to the plurality of users unencrypted together with encrypted data. Thus, it is not necessary to provide additional signalling since the counter value is transmitted together with the user data, i.e., the encrypted data packets. That is, the counter value is delivered in conjunction with the content stream (in plain text via PTM channel), thus enabling the receivers to decrypt the content.

Moreover, a session key may be calculated from a shared key and a random number, the session key being used as a further input parameter of the encryption algorithm, and the random number may be updated and sent to the plurality of user entities at certain times. Thus, the security can be improved since the random number is changed at certain times.

The random number may be updated at regular time intervals. Thus, the decryption key can be updated periodically. With this approach, no additional point to point signalling between the network and the terminal is required and thus network resources are saved.

Furthermore, the random number may be delivered unencrypted to the plurality of users. Thus, the procedure can be simplified since no extra encryption/decryption of the random number is necessary.

The shared key may be delivered to the plurality of users via a secure channel using a point-to-point connection. Thus, the security can be improved, since the shared key is not sent via multicast.

A bearer identifier may be used as a further input parameter for the encryption algorithm, and the bearer identifier may be delivered to the plurality of users via a secure channel.

The multicast message may be sent via a single physical channel.

BRIEF DESCRIPTION OF THE DRAWINGS

The present invention will be more readily understood with reference to the accompanying drawings in which.

DETAILED DESCRIPTION OF PREFERRED EMBODIMENTS

In the following, preferred embodiments of the invention is described in more detail with reference to the accompanying drawings.

Figure 1:
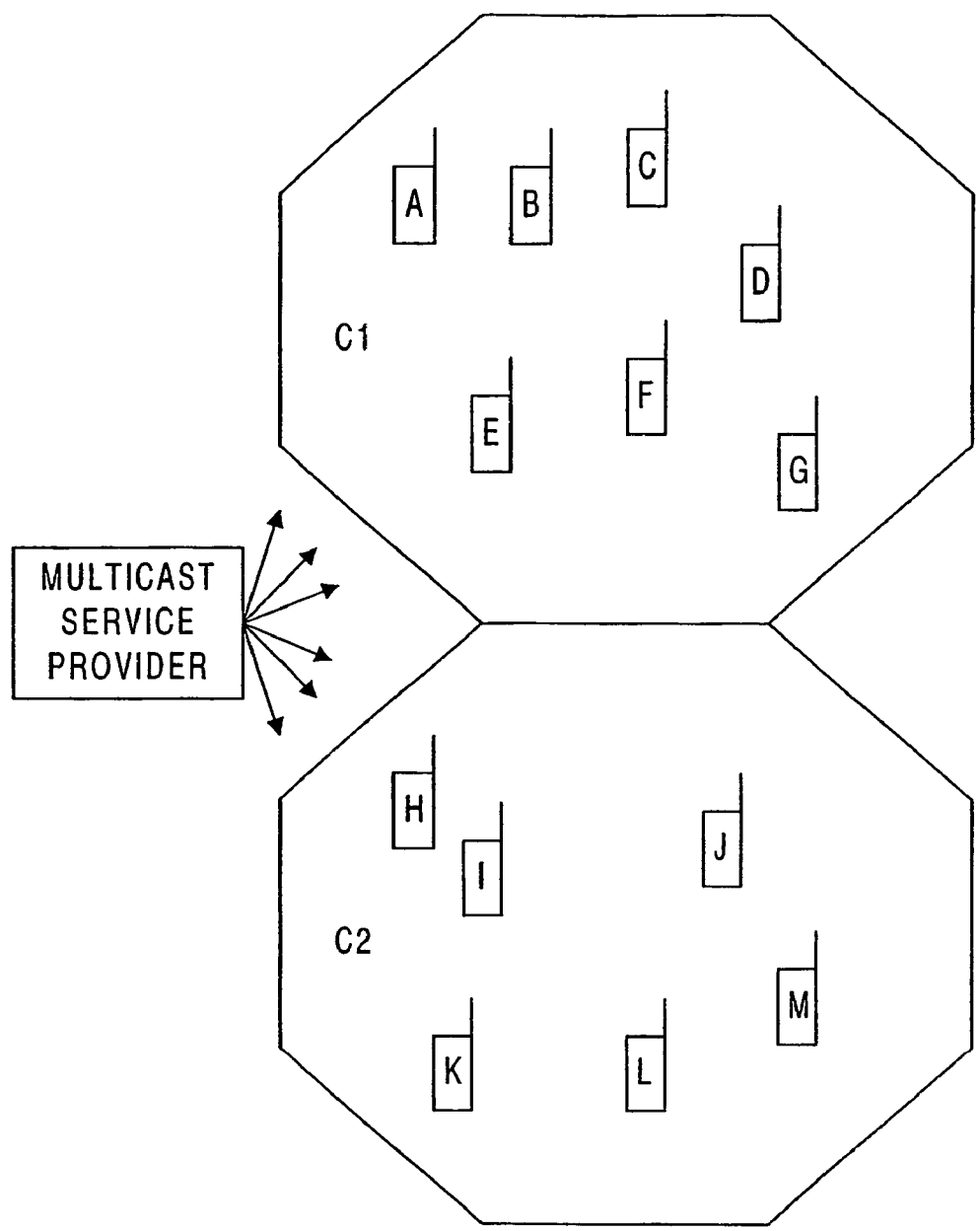
FIG. 1 illustrates two cells of a network in which the embodiments of the invention can be applied.

FIG. 1 illustrates a simplified example, wherein a multicast service provider sends messages to a plurality of UE's (User Entities) A to M by using multicast. UE's A to G are located in a cell C1, whereas UE's H to M are located in a cell C2.

According to the invention, for the multicast transmission the following requirements are seen valid:

Multicast data should be transmitted through one physical channel, the configuration information of which (i.e. Transport Formats, used codecs etc) is common knowledge.

It should be possible to separate authorised and unauthorised users of the cell.

It should be possible to establish several different multicast sessions in a cell (e.g. containing video clips, music, etc.) and the user shall be able to select which multicast session to receive.

It should be possible to make out different multicast sessions, even though they are using the same network resources e.g. on the air interface.

These requirements define that it should be possible for the operator/service provider to control the transmission of the multicast type of data in such a way that only subscribers which have registered with the multicast service are the only ones to get it as well. This is a new service concept which is not provided for in the current cell broadcast service and therefore new procedures are required.

One such procedure is the use of the ciphering for the multicast services. With the aid of ciphering the authorised and unauthorised users can be separated as well as distinction made between different services. However, because the current ciphering is designed for the point-to-point connections, some modifications are required to the current security procedure regarding:

Ciphering key allocation
Input parameters for ciphering algorithms
Management of the ciphering keys.
(Note: The changes could be done also by considering the security concept (i.e. symmetric versus asymmetric ciphering))

Next, the ciphering key allocation according to the first embodiment is described in more detail.

There are a plurality of possibilities when the information, which can be used to define the correct multicast ciphering key (Ck), can be allocated to the subscriber (i.e., the User Entity (UE)).

One possibility is when the subscriber registers with the multicast service (e.g. by WLAN, Internet, phone call, letter, personal visit etc.), based on registration the either the external service provider or operator configures the subscriber's UE to receive subscribed type of multicast services. This can be made e.g. by using config SMS or personally at the operators/service providers premises. A config SMS is an SMS (Short Message Service) type, which can be transparent to the subscriber (or reception of such SMS is agreed by the subscriber e.g. upon time when SMS is received) but which can change the information or configuration of the UE. This SMS is always sent upon RRC connected state and therefore it is ciphered by using the methods which has been defined already in 3GPP rel.99 and rel 4/5.

Another possibility is to give the information to the subscriber (UE) each time before the multicast data transmission is activated, i.e. inside the precontrol information sent to the UE (e.g. in the RRC signalling message). As an alternative the ciphering key related input parameters can also be sent by the Core network (CN) to the UE in the MM/SM (Mobility Management/Session management) level signalling message. MM and SM are functionalities in CN.

Alternatively, the information can be delivered to the UE as the peer to peer signalling connections between layers to support multicast data transmission on UTRAN and UE side. Such a layer does not exist yet, because the 3GPP RAN working groups have not yet made any decision to include such a layer. This layer can be a new layer or it can be e.g. the enhanced BMC layer.

Based on the sent information the UE can generate the correct Ck for the service.

Next, the input parameters for the ciphering algorithms used by a ciphering unit according to the first embodiment are described in more detail.

The ciphering unit is a unit either in CN or UTRAN, which consists of encryption algorithm, which uses specific input parameters to perform required ciphering transaction to the data meant to be encrypted.

In particular, modified input parameters for the ciphering unit are required. The parameters are described by referring to FIGS. 2 and 3.

Figure 2:
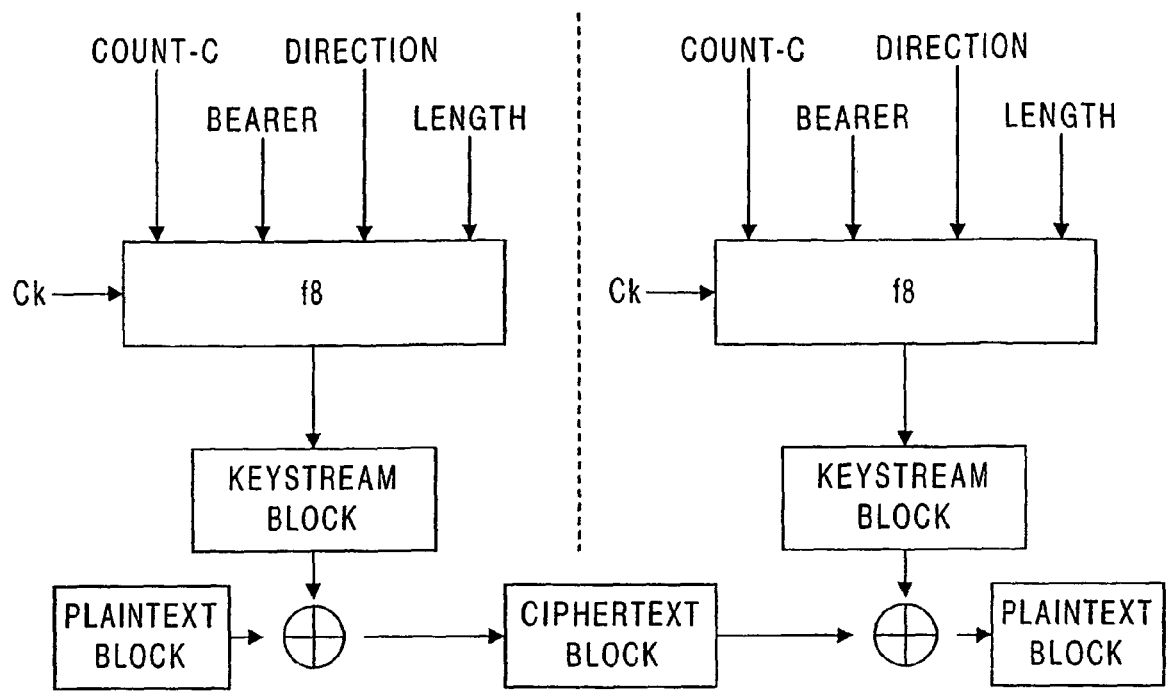
FIG. 2 shows ciphering of user and signalling data transmitted over radio access link for point-to-point services.

FIG. 2 shows ciphering of user and signalling data transmitted over the radio access link for point-to-point services, as defined in TS 33.102.

As shown in FIG. 2, a plaintext is encrypted by applying a keystream using bit per bit binary addition of the plaintext and the keystream. The keystream is generated by using the ciphering algorithm f8, which uses a ciperhing key Ck and various input parameters COUNT-C, BEARER, DIRECTION, LENGTH etc.

To support encryption for such services as the multicast services the currently used set of input parameters COUNT-C, DIRECTION and BEARER used in the ciphering unit are not applicable any more.

COUNT-C is a time dependent input, which consist of the MAC-d HFN (Hyper Frame Number, a parameter) value and CFN (Connection Frame Number, a parameter used by such services, which are using transparent RLC mode) or SFN (Sequence Frame Number, a parameter used by such services, which are using either unacknowledged or acknowledged RLC mode), which both are dependent of the current state of the data transmission and the transmission instance on the air interface. It is noted that HFN is a Hyper Frame Number, which is a parameter, CFN is a Connection Frame Number and SFN is a Sequence Frame Number, which are also a parameters. For point-to-point connections these kinds of values are possible to define, because UE and NW (Network) are synchronised at the beginning of the connection (i.e. both ends know from which value the counting of HFN and CFN/SFN should be started). In case of multicast, such synchronisation is problematic to arrange and therefore no time dependent input parameters can be used for multicast ciphering. Therefore, this not used in the first embodiment. Nevertheless, in the second embodiment a way will be presented in which a counter value may be applied.

DIRECTION identifies the direction to where corresponding data is sent. In a case of multicast the use value is always the same, because the only applicable direction is downlink.

BEARER: Each point-to-point connection is labelled with the bearer identification, which is like a banner to a group of parameters, which are assigned only for the connection, in question. Bearer identification along with the corresponding parameters for the connection is sent to the UE in RRC: RADIO BEARER SETUP message. For multicast services the support of such prescient L3 signalling exchange is impossible to provide and therefore no currently defined bearer concept can be extended to cover also the multicast services. As an alternative, it may be a valid approach to define specific new bearer types to be used for multicast and broadcast services. If such new bearers are introduced it is foreseen that ciphering algorithm also should use the corresponding new bearer identification.

After removing the parameters described above the remaining parameters do not guarantee security for the encrypted data, therefore new more suitable parameters for multicast need to be introduced. That is, the input parameters as COUNT-C (or at least HFN part), DIRECTION and BEARER (shown in FIG. 2) can be replaced with parameters such as GROUP ID, SERVICE ID, SUBSERVICE ID, PACKET ID (or FRAME ID) (FIG. 3) described in the following. These parameters can be divided into four categories: subscriber related, service related, RAN related values and cell related values.

Subscriber Related Values

GROUP ID: The purpose of the GROUP ID is to represent such value, which identifies the multicast group, which is allowed to use of this service and which is allowed to listen this multicast session. In the example of FIG. 1, UE's A, B, K and L may belong to such a multicast group.

SUBSCRIBER ID: the purpose of the SUBSCRIBER ID is identifying the subscriber. That is, in the example of FIG. 1, each of the UE's has its own SUBSCRIBER ID.

Service Related Values

SERVICE ID: the purpose of the SERVICE ID is to identify the multicast service type.

SUBSERVICE ID: The purpose of SUBSERVICE ID is to identify the particular service.

PACKET ID (or frame id): The purpose of the PACKET ID is to identify the currently received data frame or layer to SDU received from the air interface.

RAN Related Values

As an alternative it may be necessary, or it may be a benefit, to have an additional separate identity for the multicast session in RAN, namely the RANCAST ID. It is noted that the UE includes the RANCAST ID in a new type of PDP context activation message to be used for (IP) multicast registration. RNC (Radio Network Controller) shall be able to deduce the RANCAST ID from this PDP activation message. RNC can then keep track of how many mobiles have registered with a specific multicast session in every cell. RNC need not know the identity of the mobiles. Also the CN (GGSN) knows the RANCAST ID. The multicast ciphering algorithm shall be able to include RANCAST ID as an input parameter.

Cell Related Values

As an alternative the cell related values could be use to separate the used ciphering mask between e.g. the neighbour cells, when it is need to support e.g. such multicast services, which allowed data receiving only in restricted area. That is, in the example of FIG. 1, only the UE's A to G may listen to a message which is only intended for the area of cell C1.

Figure 3:
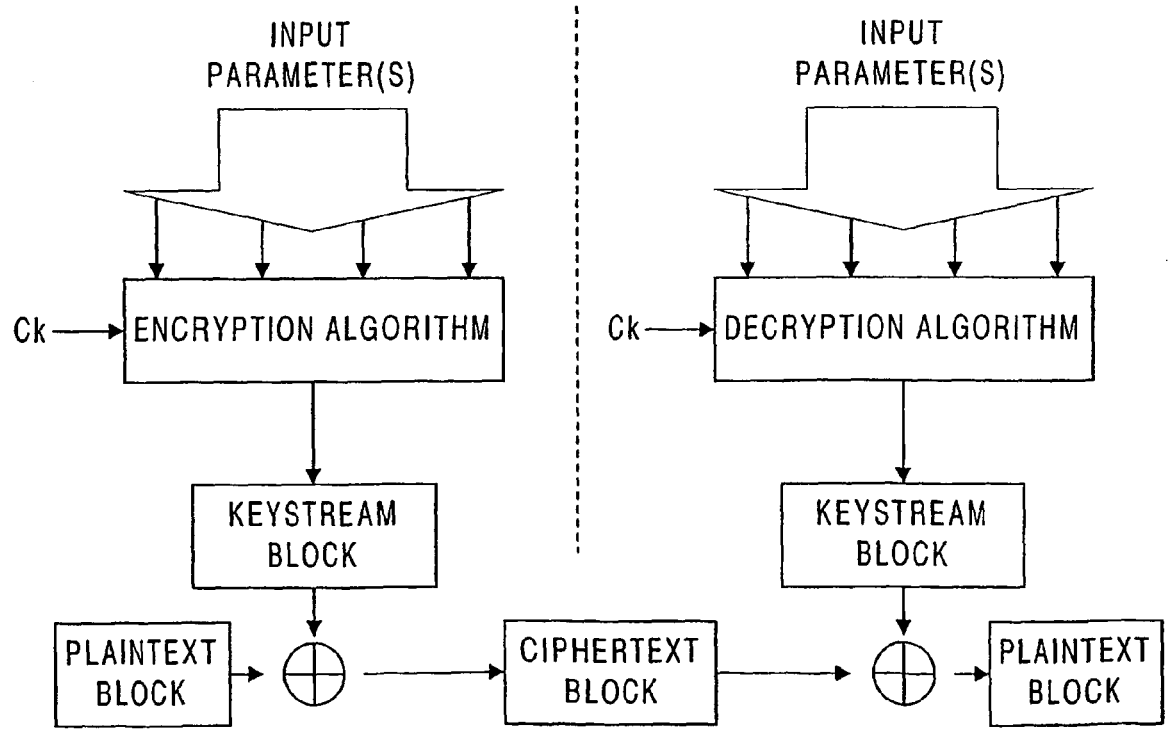
FIG. 3 shows a model to cipher data according to the first embodiment, wherein the cipher data is transmitted by using point-to-multipoint connection.

Thus, by using one or more of the above parameters as the input parameter(s) shown in FIG. 3, the group of subscribers (i.e., UE) can be restricted. Namely, only those subscribers having these parameters are able to decrypt the received message.

For example, a UE of a particular subscriber knows its GROUP ID and the SUBSERVICE ID of the service to which the subscriber is subscribed. Hence, when the UE receives a multicast message, it is able to decrypt the message. When a subscriber is not subscribed to a particular service, it may receive an encrypted multicast message, but is not able to decrypt it since the UE does not know the corresponding SUBSERVICE ID of this particular service. In case such a UE receives the message via SCCPCH, FACH or another suitable physical transport channel, it simply ignores the received message.

It is noted that not all input parameters have to be used. For example, in case the operator of the multicast service wishes to send a message to all users (e.g., for giving general information) of his service, a message may be encrypted by using no input parameter at all. In this case, all subscribers having the ciphering key are able to decrypt this message.

The input parameters described above can be used in different ways when the multicast content is ciphered.

GROUP ID and SUBSCRIBER ID can be different identifications, if there is need to identify subscribers on UE level (i.e. if there is no need for this, then these parameters can be combined). The GROUP ID is the one, which can be given to the subscriber when the subscriber makes the registration to the service. A typical GROUP ID is the "GROUP ADDRESS" used in IP-Multicasting (IGMP (Internet Group Multicasting Protocol) Message). Whereas the SUBSCRIBER ID can be e.g. the value of IMSI (in asymmetric encryption), or it can be a new specific value, which is given to the subscriber when registering to the service. The idea of using two subscriber related values is to allow operators to remove from the service e.g. such subscribers, which haven't paid they fees on time, without updating the GROUP ID to all other authorised subscribers in the very same multicast GROUP.

The SERVICE ID and SUBSERVICE ID can also either be separate values or they can be combined as a one service related parameter. The SERVICE ID is an identification which identifies the service type, e.g. news service, music service, sport clips etc., whereas the SUBSERVICE ID identifies the sent service more in detail e.g. domestic news, sport news, international news etc. The SERVICE ID could be given to the subscriber when the subscriber makes the registration, whereas SUBSERVICE ID is an identification which is transmitted to the UE along with the multicast data. The intention of this scheme is to allow the operator to separate between different services belonging to the same service type.

In the following management of the ciphering keys is described.

The validity of the ciphering key can be either:
the life time of the service or
a specific time, which is defined by the operator (e.g. hour, day, week, month etc.)

When the validity of the used ciphering key expires, still authorised subscriber is allowed to get a new ciphering key from the service provider or operator, etc. The allocation of the ciphering key can be made by the manager of the security when the UE is already in RRC connected state for some other reason, or when the UE is in idle mode.

A time limited ciphering key can be taken care of by including an expiring time in a subscriber register (e.g. HLR/RRC), which indicates when the UE needs a new ciphering key. Therefore, each time when UE/NW activates e.g. any PDP context/RRC Connection to the UE in question, the ciphering key indication shall be checked from the register and a new ciphering related information should be sent e.g. by using CN level signalling, SMS, RRC level signalling in UTRAN or peer to peer signalling between protocol layers, which are taken care of the multicast services) if indication defines that the old one has expired.

The second type of time limited ciphering key can be handled by establishing a signalling connection between UE and NW, in order to send either config SMS, or CN/UTRAN level signalling message to the UE. Based on received information the UE can update the old ciphering key to a new one.

Another alternative is to leave the initialisation of the ciphering key exchange to the UE, which internally should know when the ciphering key is expired. After expiring the ciphering key the UE can either start the ciphering key exchange procedures immediately, or it can wait until the subscriber activates another application in order to initialise RRC connection, or the subscriber has been called by third part (i.e. MTC (Mobile Terminated Call)).

In the following, storing of the security related information is described.

The storing of the security related information should comply with the following requirements:
The security related information needs to be stored in such a way that it is impossible for the subscriber or any other unauthorised user to get access to the information, both in the NW and in UE.
The information needs to be secured also against all copying transactions, which are not made by authorised service company (e.g. the manufacturer of the SIM (subscriber Identity Module, i.e., a storage device)).
At the network side the security related information could be stored either in: CN (e.g. in HLR (Home Location Register), devices of the service provider or in UTRAN (e.g. in RNC (Radio Network Controller)).
At UE side the information can be stored in SIM (Subscriber Identity Module) or in an UE memory area.
The user should not have any access either to the SIM or UE memory areas used to store the multicast deciphering keys.

When using SIM for storing the security information, it is advantageous to increase the SIM card storage capacity in order to store all necessary decryption keys and parameters, since currently this storage capacity is e.g. 8 kB or 16 kB.

Next, the encryption/decryption according to the first embodiment is described. The multicast encryption in a mobile network can be done in the following way:

The starting of the decryption can be made in at least three ways:
The receiving of data from multicast related physical channel triggers the start of the decryption. In this case the service identifications needs to be such that UE is configured to accept data belonging to this service (i.e. in service subscription/registration).
The start of the decryption is triggered by network, by sending pre-information about forthcoming multicast services.
The start of the decryption is triggered by the subscriber, upon time when the subscriber makes the "activation" of the multicast service. This trigger can be e.g. a pin code, or a password etc. Without correct trigger from subscriber the decryption of the service will not be started and subscriber will not have an access to the service. (It is noted that the use of this kind of trigger does not mean that the value of, e.g., the pin code would be used for decryption as well. It is used as a key to the service.)

The subscriber orders the service xx by sending a registration (subscribing) command to the network. The network approves the registration (subscription), e.g. by sending an SMS to the subscriber. At the same time the network also sends the parameters, which are needed to generate the correct decryption key to the mobile so that it is able to decrypt the subscribed multicast messages.

As an alternative, it may be necessary to standardise the interaction between the UE and the service provider to enable also other mechanisms than SMS, e.g. WAP.

The encryption and decryption functions are made more efficient by using symmetric cryptography. Symmetric cryptography means that the message is encrypted and decrypted by the same key.

The decryption key sent from the network to the subscriber's SIM shall not be shown to the subscriber. The decryption key (i.e., the ciphering key for decryption) is generated from a basic value (e.g., an individual service identification (which may be individual for each service) and further key generation related information, i.e., parameters, or may be generated only from the key generation parameters. The basic value (if used) may be written in the SIM or the memory of the UE during subscribing to the multicast service and, advantageously, is not sent via the radio interface. The further key related information or parameter may be a random number generated by the network. This random number may be generated based on some or all of the input parameters described above.

The transmission of the parameters is described in more detail in the following.

According to the prior art, authentication parameters are included in an Authentication and Ciphering Request message, and the MS verifies the parameters. For multicast services this kind of procedure can not be introduced, because no authentication is provided between CN and UEs.

Thus, according to the first embodiment, some of the parameters are transmitted upon registration phase. This can be done either in clear form (i.e. all parameters are readable) or a similar system as presented above can be used (i.e. from the parameters, a random number can be generated, which is sent to the UE e.g. inside the above mentioned config SMS). The some of the required parameters could be received from the system broadcast messages (SIB). This kind of information could consist of cell related information.

The rest of the information could be sent along with the multicast data, e.g. the above described PACKET ID.

Of course it is possible that all parameters, which are transmitted upon registration phase are not necessarily used for Ck generation. However in that case they are used as a input parameters to provide ciphering/deciphering.

That is, the parameters used as input parameters for the ciphering algorithm may also be used for generating the ciphering key Ck, and the parameters used for generating the ciphering key Ck may be used for ciphering and deciphering.

Multicast messages can now only be opened by SIMs, which have the correct decryption key.

The encryption (and decryption) key shall be changed in a defined time frame. The time frame can be defined by operator. The new key generation related information is sent to SIM using a multicast message, which is encrypted with the previous encryption key or by using some of the other data transmission mechanisms, as described above in the chapter on management of the ciphering keys. That is, the key generation related information may be sent when the user entity registers with a multicast service, or when a multicast transmission is activated. Alternatively, there may be a plurality of key generation related information parts (e.g., two different random numbers), a first part of which may be sent during registration with the service, and a second part may be sent on activation of the multicast service.

The encryption algorithm can be chosen freely, but it must be efficient enough to allow the normally used encryption function f8 to be used with the ciphering key length 128 bits.

The embodiment described above can be implemented in two different ways from the cryptograhic point of view.

Firstly, a symmetric ciphering can be applied. That is, the same key is used for the encryption function and for the decryption function. Thus, only one key is needed, which simplifies the procedure.

Secondly, an asymmetric ciphering can be applied. That is, encryption is done by a recipients public key and can be decrypted only by a recipient's secret key. The asymmetric function is more secure, but on the other hand slower than symmetric ciphering.

Thus, in case of a multicast service offering general information for which a high level of security is not required, the best mode of implementation is to use the symmetric ciphering.

Summarising, the invention suggests some modifications to ciphering key allocation, input parameters for ciphering algorithms and management of the ciphering keys to overcome the problems how to restrict the reception of point-to-multipoint data to a specific group of subscribers because the current ciphering is designed for point-to-point connections.

Ciphering key allocation: The information, which can be used to define the correct multicast ciphering key, can be allocated to the subscriber when the subscriber registers with the multicast service or it can be given to the UE each time before the multicast data transmission is activated or as the peer to peer signalling connections between layers to support multicast data transmission on UTRAN and UE side.

Modified input parameters for the ciphering unit: Such input parameters as COUNT-C, DIRECTION and BEARER (see FIG. 2) can be replaced with parameters such as GROUP ID, SUBSCRIBER ID, SERVICE ID, SUBSERVICE ID, PACKET ID and CELL+RAN related information (see FIG. 3).

Management of the ciphering keys: The validity of the ciphering key can be either the life time of the service or a specific time, which is defined by the operator.

Next, a second embodiment is described. As mentioned in connection with the description of the first embodiment, in particular the use of a counter value (COUNT_C) as an input parameter is problematic in multicast (PTM) services. However, according to the second embodiment a procedure is used by which nevertheless the counter value can be used. In this way, existing UMTS security mechanisms can be used to protect also multicast traffic. Thus, the features according to the second embodiment fit especially well for $3^{rd}$ Generation UMTS networks since the presented model utilizes the security features already available in the system.

In detail, in the description of the second embodiment, means are presented to utilize UMTS confidentiality protection mechanism in mobile PTM environment. UMTS confidentiality protection is originally designed for point to point (PTP) communication environment and it cannot be directly used for this purpose as such. According to the second embodiment, however, it is described how UMTS confidentiality protection can be adapted to PTM communication environments. In this context a PTM service is understood as a unidirectional data delivery from the network to a group of mobile terminals. Because the resources in the radio link are limited, the goal is to minimize uplink signalling during PTM data reception. This means that e.g. when beginning PTM data reception, no signalling between MS and network is allowed.

The UMTS confidentiality protection is based on a shared secret key (K) that is stored at the end user's USIM in the user entity, i.e., mobile station (MS), and in Authentication Center in the network. USIM itself is physically a part of UICC (Universal Integrity Circuit Card), i.e. it resides in a smart card. The end user has no access to K (on USIM). The network delivers a nonce value RAND in plain text over the radio link to the MS. From these two values (K and RAND) both the MS and the network compute a confidentiality key (CK) which is then used for symmetric encryption between MS and radio access network. For encryption, an encryption algorithm is used. An example for such an encryption algorithm is the f8 encryption algorithm, which is usually applied in UMTS. The encryption algorithm produces a key stream, which is XORed with the plain text to be delivered to the other communicating party. The f8 encryption algorithm takes four input parameters: CK, counter value, bearer identifier and direction value.

This model cannot be directly applied to PTM communication because there is no shared secret key among all the potential receivers and because the f8 key stream generation algorithm uses such input parameters that are subscriber dependent. Thus, to make f8 to work also for PTM connections, a shared key (Ks) should be delivered to all such potential receivers that will participate a certain PTM session. This could be done over a secured PTP connection between each user willing to participate in the upcoming PTM session before the actual session. The willingness to participate in an upcoming PTM session may be done e.g. by some kind of subscription procedure, which is not further discussed here. It is assumed that such a secure Ks delivery mechanism exists and Ks is stored in the MS in such a way that the user cannot have direct access to it (stored e.g. on USIM or in a terminal memory that is not accessible for the user). This way the user may not forward Ks to illegitimate parties. Ks could be valid for some predefined time period, e.g. a day or a week.

Ks is not directly used as an input parameter for f8, but it is used as a parameter for generating the actual PTM encryption/decryption key Kptm. As another input parameter for the Kptm generation algorithm a random nonce value RAND' is used. RAND' can be delivered over an unprotected PTM channel to the receivers. This way a new session key can be easily established by transmitting a new RAND' value to the receivers which can be used for new Kptm generation. The most important requirement for the derivation algorithm is that it should be one-way: even if an attacker would know both RAND' and Kptm he would have no chance in finding out Ks. Namely, the algorithm that is used to calculate Kptm (from RAND' and Ks) is public. Thus, anybody who knows RAND' and Ks can figure out Kptm. The strength of the crypto system is based on the secrecy of Ks—it is known only by the authorized users. If an attacker knows RAND' and Kptm, he can decrypt the content as long as the Kptm is valid (i.e. as long as RAND' stays the same). But when a new RAND' value is taken into use, the attacker has no way of calculating the new Kptm because he does not know Ks (he cannot derive it from Kptm and RAND').

The new Kptm can be taken into use at a certain time—this time value could be delivered in conjunction with RAND' value. To enable mobile users to join the session at any time, the RAND' must be sent via the unprotected PTM channel periodically with quite a small interval, e.g. every 5 seconds.

The algorithm that derives Kptm from Ks and RAND', of course, has to be the same for both the terminal side and the network side. If the derivation algorithm is in USIM on the terminal and it is done always in the home network on the network side then the algorithm does not have to be standardized but instead it could be operator-specific. However, it is anticipated that it could be possible to offer these multicast services also for roaming users, hence the derivation algorithm could also be located in a visited network.

In the other problem, related to f8 input parameters, some modifications to these parameters has to be made to enable its usage in PTM encryption/decryption. The session key Kptm computed from Ks and RAND' can be used as a CK parameter. The direction value (DIRECTION, as defined in the first embodiment) tells whether the delivered data is uplink (i.e. from MS to RAN) or downlink (i.e. from RAN to MS). This parameter can be used as such i.e. it is set to value downlink, because PTM data is originated from the network. The bearer id value (or a substitute for it which is also a possibility since the bearer id may be replaced with some other identifier with the same length) can be delivered to MSs at the same time as Ks is delivered via a secured PTP channel. The most problematic parameter is the counter value because its value is not constant but changes during message exchange over the secured channel. In PTP the RAN and MS are synchronized at connection setup and thus they can use this counter value in a synchronized manner during the connection. In PTM the situation is different, since there is no signaling connection between MS and the network when beginning PTM data reception and therefore RAN and MSs cannot be synchronized. Also, because there are multiple receivers that join at varying times to the session, staying in synchronization is very hard to implement.

The solution to this problem is to deliver the counter value in conjunction with the encrypted content packages over the air link. At least the most significant part of the counter value that is in use in the beginning of the sending of the content packets is transmitted to all receivers. After that the receivers and the sender are synchronized. For the rest of the connection they are able to maintain the synchronization of counter values by normal synchronization means provided by 3G UTRAN. In this case, the most significant part of the counter is never more transmitted but it is implicitly maintained in sync as the least significant part is sent explicitly.

This solution does not work for receivers who join the session at some later phase. To allow also this, the whole counter value (e.g., COUNT_C as defined in the first embodiment) should be sent with regular time intervals. Thus, at this time intervals also the receiver who joins later has all the required parameters and can apply f8 decryption to the received PTM content.

Figure 4:
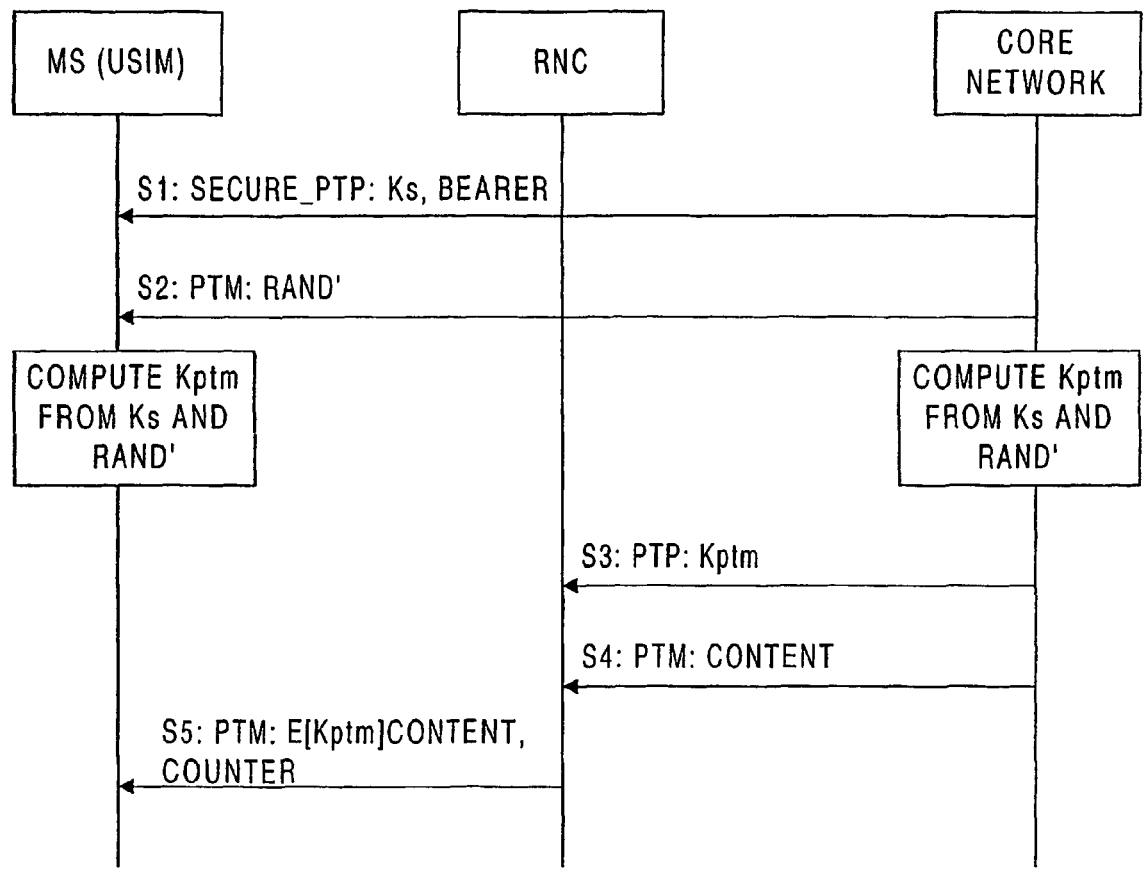
FIG. 4 shows signalling diagram according to the second embodiment.

The solution according to the second embodiment is described by referring to FIG. 4. In the figure 'E[Kptm] (...)' means that the data within the braces is encrypted with the key Kptm. The used delivery channel type is also given with each signal in the diagram. In detail, PTP indicates a point to point connection, whereas PTM indicates a point to multipoint connection.

The first signal S1 presents the procedure in which the shared secret key Ks and bearer identifier (e.g., parameter BEARER as defined in the first embodiment) of the PTM session are delivered over a secured PTP (point-to-point) connection to a session's group member. Instead of the bearer identifier (BEARER), also another similar identifier of the same length could be used.

In the second signal S2, the RAND' value used for session key generation is delivered in plain text over a PTM channel, which every receiver may listen to.

From these parameters (Ks and RAND') a subscribed user may compute the session key Kptm. These values are also stored at the network side (in some register, e.g. in AuC) and the same calculations can be carried out. Kptm is passed from the core network to RAN (actually RNC, signal S3).

Content originating from the core network comes in plain text (signal S4) to the RAN which encrypts it with Kptm. This encrypted signal with the indication of used counter value is delivered over PTM connection to the receivers (signal S5). Thus only subscribed receivers may decrypt the content since only they have the required session key Kptm.

With certain time periods the Kptm may be changed by delivering a new RAND' value to the receivers and a time value which indicates the time in which the value comes into effect. Just like described above, the terminals and the network compute a new Kptm and start using it at the given time. This operation can be called as re-keying. It might be required to deliver two different RAND' values for the same time, because a subscriber might begin content reception right in the middle of the re-keying phase when the previous key is still in use but the new RAND' value is already being delivered. Thus the new receiver may compute both the Kptm that is currently in use (and begin data reception immediately) and the new Kptm (to be prepared to receive the content in the near future).

With the approach described here multiple benefits can be gained:
- Using existing UMTS encryption algorithms the changes to the network elements can be kept in minimum.
- Uplink signaling is not required to take a new key in use during a session.
- Parameters for Kptm can be delivered using a shared unencrypted channel. Thus there is no need for PTP signaling connections for this purpose.

In the following, some alternatives to the second embodiment are described.

As a first alternative, the RAND' values used for establishing a new session key could be also delivered in conjunction with Ks and bearer id delivery over an encrypted PTP connection. In this approach there should be a list of RAND's and the validity times for these values. This way the MS could compute Kptm and the use of unencrypted PTM channel for RAND' delivery would be unnecessary. In this way, the security can be improved since also the RAND' values are delivered over a secure connection. This, however, requires that a lot of RAND' and timing data have to be stored such that large memory resources of an MS have to be occupied.

As a second alternative, the delivery of RAND' could be also done using encrypted PTP connections to each session member. The benefit of this re-keying method is that the member could also inform the network whether it wants to quit or continue its membership. Therefore a more fine-grained membership duration information would be generated and could be used e.g. for charging purposes. However, there would be a lot of signaling between the network and MS.

Thus, the preferred way to implement RAND' delivery is as described above, namely by using unencrypted PTM channel. This way the memory requirements of the encryption are kept in minimum.

As described above, the delivery of the counter value with the encrypted content is preferred procedure according to the second embodiment. In practice, the suggested method of delivering this value unencrypted is the only possibility. Namely, if the counter value would also be encrypted, the MS would have no means to figure out the counter value since the decryption depends on it. If the counter value of the next packet would be included in encrypted form to a packet, there would also be problems. An MS joining a session would need the initial value of the counter to be able to decrypt the first packet it receives. To get this initial value, some new mechanism should be introduced to prevent unnecessary signalling. On the other hand, basically the counter value is not secret information in the current UTRAN security architecture. The START parameter indicates the COUNT value in the beginning of an RRC connection; later COUNT values are changing but an eavesdropper can also maintain in sync about which COUNT value is in use.

In the following, the main features according to the second embodiment are shortly summarized. The usage of the confidentiality protection model of UMTS is not directly possible as such in point to multipoint (PTM) environment e.g. because the confidentiality key generation algorithm uses subscriber dependent input parameters (secret key). A main idea according to the second embodiment is to deliver the counter value in conjunction with the content stream (in plain text via PTM channel), thus enabling the receivers to decrypt the content. The decryption key can be updated periodically by sending a new RAND' value to the receivers. With this approach, no additional point to point signalling between the network and the terminal is required and thus network resources are saved.

It is noted that the second embodiment is not limited to the use of the f8 encryption algorithm, but that instead other encryption algorithm may be used which also use at least a counter value as an input parameter, and preferably also use a random number as an input parameter.

Furthermore, according to the second embodiment the counter value (COUNT_C) is delivered unencrypted together with the encrypted data (signal S5 in FIG. 4). Alternatively, the counter value may also be transmitted via a PTM channel (similar to the transmission of the RAND' value in signal S2 of FIG. 4). In this way, the counter value may be transmitted to the user entity at regular intervals independently of the delivery of the encrypted data packets. In this case, however, there should be some kind of association between counter value and data packets. Otherwise, it would not be known which counter value should be used to decrypt a certain packet.

As a further alternative, also the RAND' value may be transmitted in the same way as the counter value, i.e., together with encrypted data packets (as in signal S4 of FIG. 4).

The description of the second embodiment is emphasised on the encryption, however, the same procedures also apply for the decryption, as described in more detail in the first embodiment.

According to the second embodiment, Kptm is computed in the core network, as illustrated in FIG. 4. However, alternatively it can also be computed in the RNC. In this way, Ks and RAND' would have to be transmitted also to RNC.

The above description and accompanying drawings only illustrate the present invention by way of example. Thus, the embodiments of the invention may vary within the scope of the attached claims.

In particular, the first and the second embodiment can freely be combined. For example, the additional parameter (e.g., subscriber related parameter and/or cell related parameter) described in the first embodiment may also be used in the second embodiment in order to enhance security. Furthermore, the delivery of the parameters in the second embodiment may be performed in a similar way as in the first embodiment. For example, parameter delivery on registration to a multicast service may be performed using SMS or WAP.

The invention claimed is:

1. A method, comprising:
   encrypting a multicast message by using ciphering in a multicast service control device; and
   sending the encrypted multicast message from the multicast service control device to a plurality of user entities,
   performing the ciphering using a ciphering key and at least one input parameter, wherein the input parameter comprises at least one of a subscriber related value, a service related value, a network related value for identifying a particular network and a cell related value for identifying a particular cell, and wherein the at least one input parameter is configured to restrict subscribers of a plurality of subscribers to subscribers which are allowed to decrypt the multicast message,
   wherein the subscriber related value comprises at least one of a group identification for identifying a group of subscribers which are allowed to receive the message or a subscriber identification for identifying a particular subscriber, and
   wherein the service related value comprises at least one of a service identification for identifying a service type, a sub-service identification for identifying a particular service, or a frame identification for identifying a particular data frame.

2. The method according to claim 1, further comprising:
   decrypting the encrypted multicast message in each user entity individually.

3. The method according to claim 1, wherein the ciphering key is the same for encrypting and decrypting.

4. The method according to claim 1, wherein a first ciphering key is used for encrypting, and a second ciphering key different from the first ciphering key is used for decrypting.

5. The method according to claim 1, wherein the ciphering key is changed in a defined time frame.

6. The method according to claim 1, wherein ciphering key generation related parameters are sent to the user entity when the user entity registers with a multicast service.

7. The method according to claim 1, wherein ciphering key generation related parameters are sent to the user entity when a multicast transmission of encrypted multicast messages is activated.

8. The method according to claim 1, wherein the ciphering key is stored in a memory of the user entity.

9. The method according to claim 1, wherein the parameters are sent to the user entity upon registering to a service.

10. The method according to claim 1, wherein the receiving of multicast related data triggers the start of the decryption.

11. The method according to claim 1, wherein the start of the decryption is triggered by the network, by sending pre-information of a multicast message to be sent.

12. The method according to claim 1, wherein the start of the decryption is triggered by the subscriber.

13. The method according to claim 12, wherein the trigger is a pin code or a password.

14. The method according to claim 1, wherein the multicast message is sent via a single physical channel.

15. The method according to claim 1, wherein for encryption an encryption algorithm is used which uses at least a counter value as an input parameter, which is delivered to the plurality of user entities.

16. The method according to claim 15, wherein the counter value is delivered to the plurality of users unencrypted together with encrypted data.

17. The method according to claim 15, wherein a session key is calculated from a shared key and a random number, the session key being used as a further input parameter of the encryption algorithm, and wherein the random number is updated and sent to the plurality of user entities at certain times.

18. The method according to claim 17, wherein the random number is updated at regular time intervals.

19. The method according to claim 17, wherein the random number is delivered unencrypted to the plurality of users.

20. The method according to claim 17, wherein the shared key is delivered to the plurality of users via a secure channel via a point-to-point connection.

21. The method according to claim 17, wherein a bearer identifier is used as a further input parameter for the encryption algorithm, and wherein the bearer identifier is delivered to the plurality of users via a secure channel.

22. An apparatus, comprising:
an encrypting unit configured to encrypt a multicast message by using ciphering, and to send the encrypted multicast message to a plurality of user entities; and
a ciphering unit configured to cipher using a ciphering key and at least one input parameter, wherein the input parameter comprises at least one of a subscriber related value, a service related value, a network related value for identifying a particular network and a cell related value for identifying a particular cell, and wherein the at least one input parameter is configured to restrict subscribers of a plurality of subscribers to subscribers which are allowed to decrypt the multicast message,
wherein the subscriber related value comprises at least one of a group identification for identifying a group of subscribers which are allowed to receive the message or a subscriber identification for identifying a particular subscriber, and
wherein the service related value comprises at least one of a service identification for identifying a service type, a sub-service identification for identifying a particular service, or a frame identification for identifying a particular data frame.

23. The apparatus according to claim 22, wherein the ciphering key is changed in a defined time frame.

24. The apparatus according to claim 22, wherein the multicast message is sent via a single physical channel.

25. The apparatus according to claim 22, wherein the apparatus is configured to use an encryption algorithm for encryption, which algorithm uses at least a counter value as an input parameter, and to deliver the counter value to the plurality of user entities.

26. The apparatus according to claim 25, wherein the apparatus is configured to deliver the counter value to the plurality of users unencrypted together with encrypted data.

27. The apparatus according to claim 25, wherein the apparatus is configured to use a session key as a further input parameter of the encryption algorithm, the session key being calculated from a shared key and a random number, to update the random number and to send the random number to the plurality of user entities at certain times.

28. The apparatus according to claim 27, wherein the random number is updated at regular time intervals.

29. The apparatus according to claim 27, wherein the apparatus is configured to deliver the random number unencrypted to the plurality of users.

30. The apparatus according to claim 27, wherein the apparatus is configured to deliver the shared key to the plurality of users via a secure channel via a point-to-point connection.

31. The apparatus according to claim 27, wherein the apparatus is configured to use a bearer identifier as a further input parameter for the encryption algorithm, and to deliver the bearer identifier to the plurality of users via a secure channel.

32. An apparatus, comprising:
a receiver configured to receive a multicast message which is encrypted by ciphering, and
a decrypting unit configured to decrypt the multicast message by using a ciphering key and at least one input parameter, wherein the input parameter comprises at least one of a subscriber related value, a service related value, a network related value for identifying a particular network and a cell related value for identifying a particular cell, and wherein the at least one input parameter is configured to restrict subscribers of a plurality of subscribers to subscribers which are allowed to decrypt the multicast message,
wherein the subscriber related value comprises at least one of a group identification for identifying a group of subscribers which are allowed to receive the message or a subscriber identification for identifying a particular subscriber, and
wherein the service related value comprises at least one of a service identification for identifying a service type, a sub-service identification for identifying a particular service, or a frame identification for identifying a particular data frame.

33. The apparatus according to claim 32, wherein the ciphering key is changed in a defined time frame.

34. The apparatus according to claim 32, wherein the user entity is configured to receive ciphering key generation related information when the user entities registers with a service of sending encrypted messages to a plurality of user entities.

35. The apparatus according to claim 32, wherein the apparatus is configured to receive ciphering key generation related information when a transmission of encrypted messages to a plurality of user entities is activated.

36. The apparatus according to claim 32, wherein the apparatus is configured to receive the input parameters upon registering to a service.

37. The apparatus according to claim 32, wherein the apparatus is configured such that the start of receiving multicast related data triggers the start of the decryption.

38. The apparatus according to claim 32, wherein the apparatus is configured such that the start of the decryption is triggered by the network, by receiving pre-information of a multicast message to be received.

39. The apparatus according to claim 32, wherein the apparatus is configured such that the start of the decryption is triggered by the subscriber.

40. The apparatus according to claim 39, wherein the trigger is a pin code or a password.

41. The apparatus according to claim 32, wherein the multicast message is sent via a single physical channel.

42. The apparatus according to claim 32, wherein the apparatus is configured to use a decryption algorithm for decryption, which algorithm uses at least a counter value as an input parameter, and to receive the counter value from a network control device.

43. The apparatus according to claim 42, wherein the apparatus is configured to calculate a session key from a shared key and a random number, and to use the session key a further input parameter of the decryption algorithm.

44. The apparatus according to claim 43, wherein the apparatus is configured to receive the shared key via a secure channel.

45. The apparatus according to claim 43, wherein the apparatus is configured to use a bearer identifier as a further input parameter for the decryption algorithm.

46. An apparatus, comprising:
encrypting means for encrypting a multicast message by using ciphering, and for sending the encrypted multicast message to a plurality of user entities; and
ciphering means for ciphering using a ciphering key and at least one input parameter, wherein the input parameter comprises at least one of a subscriber related value, a service related value, a network related value for identifying a particular network and a cell related value for identifying a particular cell, and wherein the at least one input parameter is configured to restrict subscribers of a plurality of subscribers to subscribers which are allowed to decrypt the multicast message,
wherein the subscriber related value comprises at least one of a group identification for identifying a group of subscribers which are allowed to receive the message or a subscriber identification for identifying a particular subscriber, and
wherein the service related value comprises at least one of a service identification for identifying a service type, a sub-service identification for identifying a particular service, or a frame identification for identifying a particular data frame.

47. A non-transitory computer program embodied on a computer readable medium, said computer program configured to control a processor to perform:
encrypting a multicast message by using ciphering in a multicast service control device; and
sending the encrypted multicast message from the multicast service control device to a plurality of user entities,
performing the ciphering using a ciphering key and at least one input parameter, wherein the input parameter comprises at least one of a subscriber related value a service related value, a network related value for identifying a particular network and a cell related value for identifying a particular cell, and wherein the at least one input parameter is configured to restrict subscribers of a plurality of subscribers to subscribers which are allowed to decrypt the multicast message,
wherein the subscriber related value comprises at least one of a group identification for identifying a group of subscribers which are allowed to receive the message or a subscriber identification for identifying a particular subscriber, and
wherein the service related value comprises at least one of a service identification for identifying a service type, a sub-service identification for identifying a particular service, or a frame identification for identifying a particular data frame.

48. A method, comprising:
receiving a multicast message which is encrypted by ciphering, and
decrypting the multicast message by using a ciphering key and at least one input parameter, wherein the input parameter comprises at least one of a subscriber related value, a service related value, a network related value for identifying a particular network and a cell related value for identifying a particular cell, and wherein the at least one input parameter is configured to restrict subscribers of a plurality of subscribers to subscribers which are allowed to decrypt the multicast message,
wherein the subscriber related value comprises at least one of a group identification for identifying a group of subscribers which are allowed to receive the message or a subscriber identification for identifying a particular subscriber, and
wherein the service related value comprises at least one of a service identification for identifying a service type, a sub-service identification for identifying a particular service, or a frame identification for identifying a particular data frame.

49. An apparatus, comprising:
receiving means for receiving a multicast message which is encrypted by ciphering, and
decrypting means for decrypting the multicast message by using a ciphering key and at least one input parameter, wherein the input parameter comprises at least one of a subscriber related value, a service related value, a network related value for identifying a particular network and a cell related value for identifying a particular cell, and wherein the at least one input parameter is configured to restrict subscribers of a plurality of subscribers to subscribers which are allowed to decrypt the multicast message,
wherein the subscriber related value comprises at least one of a group identification for identifying a group of subscribers which are allowed to receive the message or a subscriber identification for identifying a particular subscriber, and
wherein the service related value comprises at least one of a service identification for identifying a service type, a sub-service identification for identifying a particular service, or a frame identification for identifying a particular data frame.

50. A non-transitory computer program embodied on a computer readable medium, said computer program configured to control a processor to perform:
receiving a multicast message which is encrypted by ciphering, and
decrypting the multicast message by using a ciphering key and at least one input parameter, wherein the input parameter comprises at least one of a subscriber related value, a service related value, a network related value for identifying a particular network and a cell related value for identifying a particular cell, and wherein the at least one input parameter is configured to restrict subscribers of a plurality of subscribers to subscribers which are allowed to decrypt the multicast message,
wherein the subscriber related value comprises at least one of a group identification for identifying a group of subscribers which are allowed to receive the message or a subscriber identification for identifying a particular subscriber, and
wherein the service related value comprises at least one of a service identification for identifying a service type, a sub-service identification for identifying a particular service, or a frame identification for identifying a particular data frame.

* * * * *